United States Patent Office

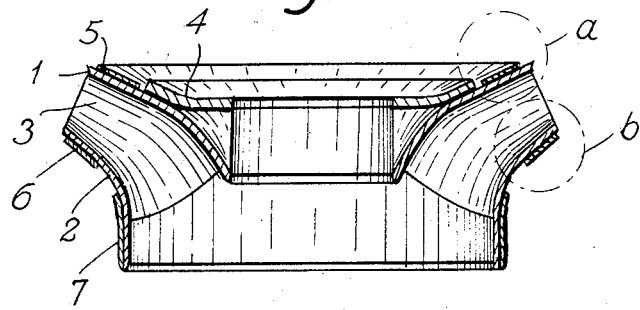
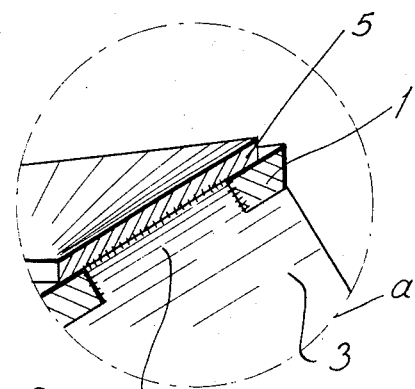
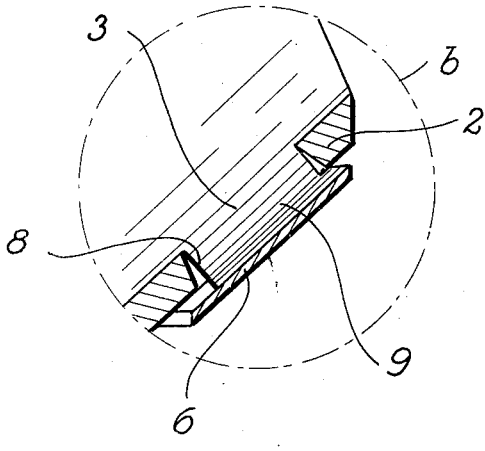
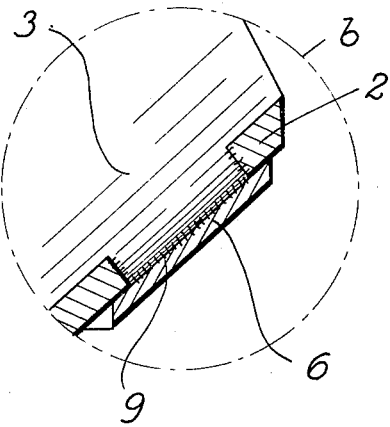

3,507,581
Patented Apr. 21, 1970

3,507,581
APPARATUS, MORE PARTICULARLY AN IMPELLER OR GUIDING DEVICE FOR CENTRIFUGAL PUMPS
Niels Due Jensen, Viborg, Denmark, assignor to Grundfoss Bjerringbro Pumpefabrik A/S, Bjerringbro, Denmark
Filed Aug. 8, 1967, Ser. No. 659,144
Claims priority, application Denmark, Aug. 9, 1966, 4,106/66
Int. Cl. F04d 29/26; B21k 3/04
U.S. Cl. 416—182      4 Claims

ABSTRACT OF THE DISCLOSURE

An apparatus, for example an impeller consisting of two concentric skirts with vanes mounted therebetween, and in which all parts are made by drawing or punching of sheet material and interconnected by welding; the vanes have guide pins engaging openings in the skirts. To facilitate the manufacture and to render a smooth surface of the outer skirt possible, there is here provided an annular plate covering and welded to the guide pins.

BACKGROUND OF THE INVENTION

Figure 5:
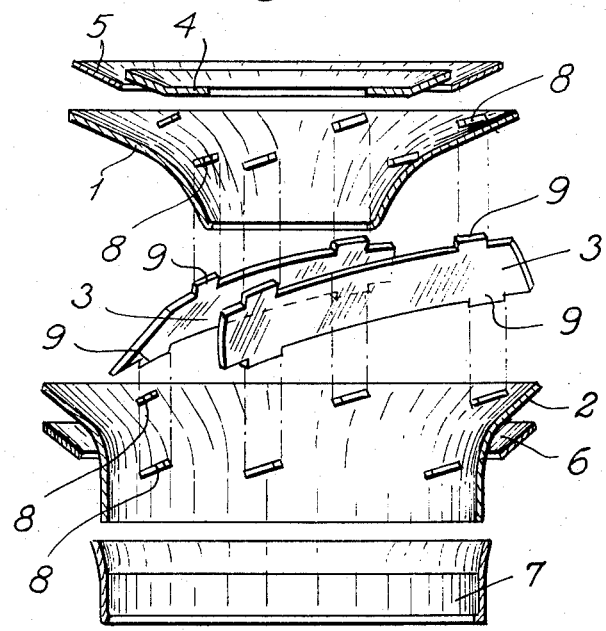

The invention relates to welded apparatus such as, for example, impellers or guiding devices for centrifugal pumps, made of sheet material, more particularly stainless steel sheet, by drawing of parts and welding these.

Previously, openings have been made in skirts and pins provided on vane elements, the parts being united by welding after the assembly when the pins are located in the openings. As a result, there will be protrusions or beads on the surface of the skirts, which is unfavorable to the unhindered flow and to the appearance of the apparatus, wherefore the apparatus has to be subjected to subsequent turning in a lathe. Such a turning operation cannot be made with perfect accuracy, wherefore it becomes necessary to make a subsequent balancing of the apparatus, which is a rather difficult and time-consuming operation. Since it is impossible to avoid reducing the thickness of material at certain places when turning, it will usually be necessary to use a greater thickness of material than would be necessary if no such damage of the surface had taken place.

SUMMARY OF THE INVENTION

The invention relates to an apparatus, more particularly an impeller or a guiding device for centrifugal pumps; the apparatus has two concentric skirts with a plurality of vanes mounted therebetween, all the parts being made by drawing or punching of sheet material and interconnected by welding; the said vanes are provided with guide pins received in corresponding openings provided in the skirts, the said openings being arranged in circles, each lying in a plane at right angles to the longitudinal axis of the impeller, and opposite at least one circle of openings in each skirt there is provided an annular plate lying in intimate contact with the surface of the skirt covering the guide pins to which it is welded.

In this design the lathe-turning is obviated, the annular plates being during the welding operation brought into intimate contact with the outer surface of the skirts to thereby become integral therewith, whereby any disequilibrium is eliminated and smooth, outer surfaces are produced. Since no material is removed, thinner plate material may be used with a consequent reduction in cost exceeding the cost of the material required for the annular plates. A substantial economy is obtained in working time, both for lathe-turning and balancing, and a more attractive appearance is furnished to the apparatus.

An embodiment of the apparatus according to the invention will now be described with reference to the drawing, in which FIGURE 1 shows a section of an impeller for a centrifugal pump, viewed from the side, FIGURE 2 is a detail view of part of FIGURE 1, surrounded by the circle *a*, on a larger scale, FIGURE 3 is a detail view of part of FIGURE 1 surrounded by the circle *b* on a larger scale, prior to the welding, FIGURE 4 shows the same detail as shown in FIGURE 3, after the welding, and FIGURE 5 is an exploded view of the impeller prior to the assembly.

The impeller as shown in FIGURE 5 comprises an inner skirt 1, an outer skirt 2, a number of guide vanes 3 mounted between the said skirts and four annular members 4, 5, 6 and 7. The two skirts 1 and 2 are each provided with two circles of oblong openings 8 which are adapted to receive corresponding oblong guide pins 9 provided on the vanes. In a special embodiment, shown in FIGURE 3, the guide pins 9 are formed as rectangles, whereas the holes 8 are formed as trapezoids, that is, widened outwardly, so that when the pin is inserted into the hole, there will be produced triangular clearance spaces as shown in FIGURE 3.

All the parts are made by drawing or punching of sheet material, preferably stainless steel.

When the impeller is assembled, the vanes 3 are mounted on skirt 2, all guide pins 9 being introduced into the corresponding holes 8, after which the other skirt 1 is mounted in the same manner. The vanes are formed in such manner that the pins 9 project a distance through the holes 8 of the uppermost circle of holes in each skirt, whereas the pins in the other holes are flush with the surface of the skirts or terminate slightly beneath these. While the parts are being held together by means of a suitable tool, the plate 6 is mounted as indicated in FIGURE 3 so as to rest against the pins 9, that is, at a short distance from the surface of the skirt 2. The parts are then united by pressure welding so that the section shown in FIGURE 3 assumes the appearance shown in FIGURE 4. The welding is performed by feeding an electric current to the blank through copper electrodes fastened around the vanes 3. From the vanes the current flows into the pins 9, through the welding zone and into the ring 6 and to the uppermost copper electrode. The greatest resistance will occur where the pins 9 are in contact with the ring 6, and with sufficient current a welding temperature is attained. Since the pins are located rather close to the welding zone, they are heated to such a temperature that they are brought to a flow state by the welding pressure so that they fill the hole in the skirt 1, 2. By this welding operation the pin 9 is upset so that it fills the conical opening 8, and the sides of the pin are pressed against the sides of the opening, and the outwardly facing edge of the pin is welded to the annular plate 6. As a result, a safe attachment and a smooth, outer surface is obtained.

The other plate-shaped ring 5 is attached in similar manner to the skirt 1.

After the said pressure welding of the uppermost pins in the vanes by means of the annular plates 5 and 6, the annular plate 4 is mounted, covering the lower holes of the skirt 1. The plate is attached by spot welding. To the other skirt 2 is attached the ring 7, likewise by spot welding. The said ring covers the lower openings of the skirt 2. The impeller will now be of the appearance shown in FIGURE 1 and is ready for use. The impeller has a smooth surface, and any finish treatment or weighing etc. is unnecessary.

What is claimed is:

1. An impeller for centrifugal pumps, said impeller comprising two concentric circular skirts with a plurality of vanes mounted therebetween, each skirt having two circles of openings each lying in a plane at right angles to the axis of the skirts, said circles of openings being axially offset in said skirts, said vanes including guide pins received in corresponding openings in the skirts, and an annular plate mounted at each of the circles of openings in each skirt on a side thereof opposite the vanes, said annular plates being secured in intimate contact with the surface of the skirt to cover the guide pins, and weld means joining said skirts, guide pins and plates at least at one circle of openings in each skirt.

2. Apparatus as claimed in claim 1 wherein each vane comprises four guide pins formed as oblong webs and made of sheet material, said pins on each vane being received in the two circles of openings provided in each skirt.

3. Apparatus as claimed in claim 1 wherein said skirts and vanes are constituted of sheet material.

4. Apparatus as claimed in claim 3 wherein said pins are rectangular and said openings are trapezoidal to form spaces between the pins and the skirts when the pins are inserted in said openings whereby to facilitate formation of the weld means.

References Cited

UNITED STATES PATENTS

| | | | |
|---|---|---|---|
| 1,484,579 | 2/1924 | Still | 230—134 |
| 2,344,444 | 3/1944 | Malczewski | 230—134 |
| 2,855,852 | 10/1958 | Gamble | 103—115 |
| 3,221,398 | 12/1965 | Mayne | 29—156.8 |
| 1,637,652 | 8/1927 | Ness | 230—134 |
| 1,877,347 | 9/1932 | McMurolie | 230—134 |
| 3,019,736 | 2/1962 | Stalker | 103—115 X |
| 3,059,582 | 10/1962 | Greene et al. | 103—115 X |
| 3,107,627 | 10/1963 | Clarke et al. | 103—115 |

HENRY F. RADUAZO, Primary Examiner

U.S. Cl. X.R.

29—156.8